United States Patent [19]

Martinez et al.

[11] Patent Number: 4,838,685
[45] Date of Patent: Jun. 13, 1989

[54] METHODS AND APPARATUS FOR MOTION ESTIMATION IN MOTION PICTURE PROCESSING

[75] Inventors: Dennis M. Martinez, Dedham; Jae S. Lim, Winchester, both of Mass.

[73] Assignee: Massachusetts Institute of Technology, Cambridge, Mass.

[21] Appl. No.: 34,771

[22] Filed: Apr. 3, 1987

[51] Int. Cl.⁴ .............................................. G03B 21/32
[52] U.S. Cl. ...................................... 352/85; 352/39; 352/38; 358/81; 358/82
[58] Field of Search ....................... 352/38, 42, 85, 87, 352/39; 358/81, 82

[56] References Cited

U.S. PATENT DOCUMENTS

| | | | |
|---|---|---|---|
| 4,383,272 | 5/1983 | Netravali et al. | 358/136 |
| 4,606,625 | 8/1986 | Geshwind | 352/85 |
| 4,755,870 | 7/1988 | Markle et al. | 358/81 |

OTHER PUBLICATIONS

Ted J. Broida and Rama Chellappa, "Estimation of Object Motion Parameters from Noisy Images" *IEEE Transactions on Pattern Analysis and Machine Intelligence*, vol. PAMI-8, No. 1, Jan. 1986, pp. 90–99.
B. G. Haskell, Frame-to-Frame Coding of Television Pictures Using Two-Dimensional Fourier Transforms. *IEEE Trans. on Information Theory*, IT-20, (No. 1): pp. 119–120, Jan. 1974.
J. O. Limb and J. A. Murphy. Measuring the Speed of Moving Objects from Television Signals, *IEEE Trans. on Communications*, vol. COM-23 (No. 4): pp. 474–478, Apr. 1975.
Ciro Cafforio and Fabio Rocca, Methods for Measuring Small Displacements of Television Images, *IEEE Trans. on Information Theory*, vol. IT-22: pp. 573–579, Sep. 1976.
A. N. Netravali and J. D. Robbins, Motion-Compensated Television Coding: Part 1. *The Bell System Technical Journal*, vol. 58: pp. 631–670, Mar. 1979.
J. A. Stuller and A. N. Netravali, Transform Domain Motion Estimation, *The Bell System Technical Journal*, vol. 58:1673–1702, Sep. 1979.
A. N. Netravali and J. D. Robbins, Motion-Compensated Coding: Some New Results, *The Bell System Technical Journal*, vol. 59: pp. 1735–1745, Nov. 1980.
John W. Roach and J. K. Aggarwal, Determining the Movement of Objects from a Sequence of Images, *IEEE Trans. on Pattern Analysis and Machine Intelligence*, vol. PAMI-2 (No. 6): pp. 554–562, Nov. 1980.
B. K. P. Horn and B. G. Schunck, Determining Optical Flow, *Artificial Intelligence*, vol. 17: pp. 185–203, 1981.
T. S. Huang and R. Y. Tsai, Image Sequence Analysis: Motion Estimation, chapter 1, pp. 1–18, Springer-Verlag, 1981.
R. Y. Tsai and T. S. Huang, Estimating Three Dimensional Motion Parameters of a Rigid Planar Patch. *IEEE Trans. on Acoustics, Speech, and Signal Processing*, vol. ASSP-29 (No. 6): pp. 1147–1152, Dec. 1981.
Y. Ninomiya and Y. Ohtsuka, A Motion-Compensated Interframe Coding Scheme for Television Pictures, *IEEE Trans. on Communications*, vol. COM-30 (No. 1): pp. 201–211, Jan. 1982.

(List continued on next page.)

*Primary Examiner*—Monroe H. Hayes
*Attorney, Agent, or Firm*—Thomas J. Engellenner

[57] ABSTRACT

Methods and apparatus for motion estimation in motion picture processing are disclosed in which an initial velocity vector is selected as an estimation of the displacement of a region from a location in a first frame to a corresponding location in a second frame and the velocity estimate is then refined by minimizing an average value of the squared directional gradient residual over the region. A continuous signal representation is obtained from a set of image intensity samples over the region of interest and, from this continuous representation, directional gradients are computed and an average squared directional gradient residual is minimized by eigenvalue/eigenvector decomposition to obtain the velocity field estimate. Particular applications of this technique include frame rate conversion, image enhancement and picture coding.

31 Claims, 4 Drawing Sheets

OTHER PUBLICATIONS

E. Dubois and S. Sabri, Noise Reduction in Image Sequences Using Motion-Compensated Temporal Filtering, IEEE Trans. on Communications, vol. COM-32 (No. 7): 826-831, Jul. 1983.

R. Paquin and E. Dubois, A Spatio-Temporal Gradient Method for Estimating the Displacement FIELD In Time-Varying Imagery, *Computer Vision, Graphics, and Image Processing,* vol. 21: pp. 205-221, 1983.

Brian Lee Hinman, *Theory and Applications of Image Notion Estimation.* Master's Thesis, Massachusetts Institute of Technology, 1984.

Edward A. Krause, *Motion Estimation and Interpolation in Time-Varying Imagery,* Master's Thesis, Massachusetts Institute of Technology, 1984.

R. Srinivasan and K. R. Rao, Predictive Coding Based on Efficient Motion Estimation, IEEE Trans. on Communications, vol COM-33 (No. 8): 888-896, Aug. 1985.

METHODS AND APPARATUS FOR MOTION ESTIMATION IN MOTION PICTURE PROCESSING

The U.S. government has rights in this invention pursuant to NSF Grant No. DC1-8407285.

BACKGROUND OF THE INVENTION

The technical field of this invention is signal processing and, in particular, the estimation of motion in motion picture frames.

A motion picture is composed of a sequence of still frames which are displayed in rapid succession. The frame rate necessary to achieve proper motion rendition in typical visual scenes is sufficiently high that there is a great deal of temporal redundancy among adjacent frames. Most of the variation from one frame to the next is due to object motion. This motion may occur within the scene or relative to the camera which generates the sequence of still frames.

There are a wide variety of applications where one desires to manipulate a motion picture by exploiting the temporal redundancy. In order to do this, it is necessary to account for the presence of motion. A number of systems are known for determining the movement of objects within the sequence of still frames. The process of determining the movement of objects within image sequences is known as motion estimation.

In general, prior systems for motion estimation have encountered three primary problems. First, such systems often have difficulty in accurately estimating motion in noisy images. Many systems are explicitly formulated under the assumptions of high signal-to-noise level. As a consequence, if the systems are applied to noisy pictures, the motion estimation errors are typically large. Most motion-compensated, image-processing systems require very accurate motion estimates in order to maintain adequate picture quality.

Second, objects within the image sequence which move with large velocities are difficult to track. In real-life motion pictures, the velocity field is a complicated function of spatio-temporal position; different parts of a motion picture move with different velocities. Therefore, most motion estimation systems are based on local operations (i.e., motion is estimated over a small region of the image). One of the problems with this approach is that typically only small velocity fields can be estimated reliably.

Third, the need to reduce computational complexity is an ever-present problem. Many applications of motion compensation require real-time operation. For real-time operation to be feasible, it is necessary for the system to be computationally efficient. Even in those applications where real-time operation is not required, computational complexity is an important characteristic which affects the cost of implementing a specific motion estimation system.

There exists a need for better motion estimation systems. Systems that address the problems of background noise, large velocities and computational complexity would satisfy a long-felt need in the art. It is an object of the present invention to provide better motion estimation systems for image processing purposes, including speed alteration, still image enhancement, picture coding and various other applications.

In the description of the present invention, matrix and vector notations are used. Matrices are represented with upper case symbols (A, B, etc.) and vectors are represented with either upper or lower case symbols with a bar over the symbol ($\bar{a}$, $\bar{b}$, $\bar{S}$ etc.). For example, a set of linear equations is written as $$A\bar{x} = \bar{b}.$$

The inverse of a matrix A is written as $A^{-1}$, and the transpose is written as $A^T$. Entries to a matrix are referred to with indexed notation. Therefore, $A_{ij}$ or $A(i,j)$ refers to the $i^{th}$ row and $j^{th}$ column of matrix A.

All vectors are column vectors. Entries of a vector are referred to with subscripted notation. Therefore, $b_i$ refers to the $i^{th}$ element of vector $\bar{b}$.

The signals are either single images or sequences of images which comprise a motion picture. The luminance of an image is a function of two variables, x and y. For the sake of notational convenience, the tuple (x,y) will be written as x in many occasions. Therefore, the image s(x,y) is equivalent to the image $s(\bar{x})$. Continuous sequences of images are written as $s(x,y,t) = s(\bar{x},t)$. Therefore, $s(\bar{x},t_o)$ refers to the frame at the time instant $t_o$.

SUMMARY OF THE INVENTION

A motion picture defined by a plurality of picture frames can be processed in a variety of ways by first determining the movement of objects within the image sequence. Motion estimation techniques for determining the velocity field of predetermined regions of the image are disclosed herein. These estimation techniques are applicable to noise reduction, frame rate conversion, and picture coding, Let I(x,y,t) denote the intensity of a motion picture frame at time t and spatial position (x,y). In the present invention, it is assumed that a motion picture frame $I(x,y,t_o)$ can be mapped into I(x,y,t) with the mapping functions $a_x(x,y,t)$ and $a_y(x,y,t)$ as follows:

$$I(x,y,t) = I(a_x(x,y,t), a_y(x,y,t), t_0) \quad (1)$$

The mapping functions $a_x$ and $a_y$ determine corresponding points between frame $I(x,y,t_o)$ and frame I(x,y,t). In effect, the motion estimation problem is to determine these mapping functions. An important consequence of the relationship indicated in Equation (1) above is that the velocity field is related to I(x,y,t) as follows:

$$v_x(x,y,t)\frac{\partial I}{\partial x} + v_y(x,y,t)\frac{\partial I}{\partial y} + \frac{\partial I}{\partial t} = 0 \quad (2)$$

In many cases of practical interest, the velocity field is sufficient to relate corresponding points between two adjacent frames.

The motion estimation methods and apparatus of the present invention are directed to the determination of the components of velocity field, $v_x$ and $v_y$ at arbitrary points between two given frames.

By assuming that the velocity components $v_x$ and $v_y$ are constant over a region $\Psi$, equation (2) above, is reduced to:

$$v_x \frac{\partial I}{\partial x} + v_y \frac{\partial I}{\partial y} + \frac{\partial I}{\partial t} = 0 \quad (2A)$$

The function set forth on the left hand side of equation 2A is defined herein as the directional gradient residual ("DGR"). In the present invention, a least squares estimate of $v_x$ and $v_y$ is obtained by minimizing the average value of $(DGR)^2$ over the region $\Psi$:

$$\min_{v_x,v_y} \iiint_\psi \left( \left( v_x \frac{\partial I}{\partial x} + v_y \frac{\partial I}{\partial y} + \frac{\partial I}{\partial t} \right)^2 \right) dx\, dy\, dt \quad (3)$$

Equation (3) forms the basis for the motion estimation method disclosed herein. There are five novel features of this method which are discussed in the following sections:

(1) Signal models are used to solve Equation (3) given only image intensity samples (as opposed to continuous functions).

(2) Numerical stability is achieved by incorporating an eigenvalue/eigenvector decomposition in the linear equations implied by Equation (3).

(3) Motion estimation accuracy is improved by using weighted averaging of individual velocity estimates.

(4) Region incompatibility is detected by examination of the least squares residual.

(5) Large velocities are estimated by applying the method using multigrid techniques.

Because the least squares estimation approach involves quadratic functions of the parameter values, the optimal velocity components $v_x$ and $v_y$ of the velocity field $\bar{v}$ can be determined from a set of linear equations:

$$W\bar{v} = \bar{\gamma} \quad (4)$$

where W is a covariance matrix and $\bar{\gamma}$ is a correlation vector. W and $\bar{\gamma}$ are given by the following equations:

$$W = \begin{bmatrix} \iiint_\psi \left( \frac{\partial I}{\partial x} \right)^2 dx\, dy\, dt & \iiint_\psi \left( \frac{\partial I}{\partial x} \right)\left( \frac{\partial I}{\partial y} \right) dx\, dy\, dt \\ \iiint_\psi \left( \frac{\partial I}{\partial x} \right)\left( \frac{\partial I}{\partial y} \right) dx\, dy\, dt & \iiint_\psi \left( \frac{\partial I}{\partial y} \right)^2 dx\, dy\, dt \end{bmatrix} \quad (5)$$

and $$\bar{\gamma} = \begin{bmatrix} -\iiint_\psi \left( \frac{\partial I}{\partial x} \right)\left( \frac{\partial I}{\partial t} \right) dx\, dy\, dt \\ -\iiint_\psi \left( \frac{\partial I}{\partial y} \right)\left( \frac{\partial I}{\partial t} \right) dx\, dy\, dt \end{bmatrix} \quad (6)$$

As will be described in more detail below, W and $\bar{\gamma}$ can be derived solely from the image intensity or luminance by least squares signal estimation techniques. The solution technique applied to equation (4) is referred to hereinafter as "eigenvalue/eigenvector decomposition."

In another aspect of the invention, signal estimation techniques are disclosed for obtaining a set of signal coefficients $S_i$ from samples of $I(x,y,t)$. A three dimensional parametric signal model is employed which assumes that the signal in region $\Psi$ can be represented by the following equation:

$$I(x,y,t) \approx \tilde{I}(x,y,t) = \sum_{i=1}^{P} S_i \phi_i(x,y,t) \quad (7)$$

where $S_i$ are a set of signal coefficients and $\Phi_i(x,y,t)$ are predetermined basis functions. A least squares estimate of $S_i$ is obtained by minimizing the error function:

Given $I(x_j,y_j,t_j)$ for $j = 1, \ldots, N \rightarrow \tilde{I}$ \quad (8)

$$\min_{\{S_i\}} \left\{ \sum_{j=1}^{N} \left( I(x_j,y_j,t_j) - \sum_{i=1}^{P} S_i \phi_i(x_j,y_j,t_j) \right)^2 \right\}$$

A linear relationship between the model parameters and the signal exists, which greatly simplifies the calculations. With this approach, the available samples are used to estimate the signal coefficients. These signal coefficients are used to compute the entries for the covariance matrix W and the correlation vector $\bar{\gamma}$, which are then used to estimate the velocity field.

In yet another aspect of the invention, techniques are described below for addressing the problem of uniform luminance (background) values throughout sampled region and the special problem of motion estimation in the presence of edges. In both of these instances the eigenvectors and eigenvalues of the covariance matrix W can be used to resolve the ambiguity. In particular, for the case of edges the eigenvectors of W point in the directions of minimum and maximum contrast. By applying a singular value decomposition (SVD) to the matrix W, an estimate of the velocity field in the direction orthogonal to the edge can be generated.

The invention can also be employed in a multigrid fashion to progressively refine the velocity field estimates. This technique is particularly useful in determining large velocities, with both high resolution and high accuracy. In the multigrid approach, the velocity field is first determined over the entire image on a coarse grid. The coarse grid is obtained from the original frames by down-sampling the images. Down-sampling the images has the property of contracting the velocity field; large velocities in the original frames become small velocities in the down-sampled frames.

The coarse velocity field is interpolated to generate initial estimates of the velocity field at a finer grid. The velocity field is then calculated by the methods of the present invention again using a finer subset of samples (i.e. a smaller down-sampling factor). The process can be repeated at successively finer grids until the sampling factor is unity.

Also disclosed herein are techniques for improving velocity estimates by weighted averaging; techniques for selecting the region $\Psi$ on each of the comparison frames from an initial velocity estimate; and techniques for detecting regions of inaccurate motion estimates.

The invention will be described next in connection with certain preferred embodiments. In particular, the overall apparatus and methods will be described and applied to the specific problems of image synthesizing (i.e. between frame images), noise reduction and picture coding. However, it should be clear that various changes, additions and subtractions can be made without departing from the spirit or scope of the invention. For example, the method can be applied to color images by letting the image intensity values be equal to the luminance component. Moreover, although a set of three dimensional polynomials are used herein to provide a continuous signal representation of the image samples, other representations can also be employed. The continuous representation need only be a linear combination of predefined basis functions which are differentiable and linearly independent.

Background materials and further details on particular implementations can be found in Appendix A, a doctorate thesis by D. Martinez, a co-inventor herein. Appendix A is submitted herewith and incorporated by reference.

DETAILED DESCRIPTION

Figure 1:
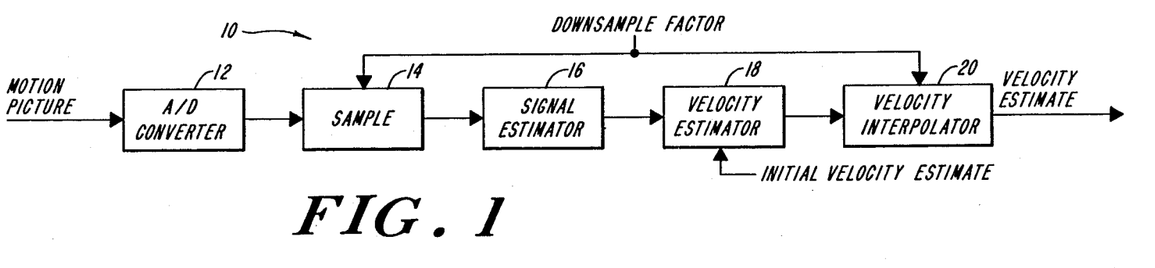
FIG. 1 is a schematic illustration of a motion estimation apparatus according to the invention.

FIG. 1 is a block diagram of a motion estimation apparatus 10 according to the present invention including an analog-to-digital (A/D) converter 12, a signal sampler 14, a signal estimator 16, a velocity estimator 18, and a velocity interpolator 20. The A/D converter 12 serves to digitize the image in any given frame into individual pixels (e.g. a 512×512 grid of image pixels) and assigns to each pixel a luminance value (e.g. ranging from 0 "black" to 255 "white"). The signal sampler 14 down-samples the pixels by a predefined factor. For example, by down-sampling by a factor of 2, one out of four pixels is sampled; similarly, down-sampling by a factor of four results in one out of sixteen pixels being sampled.

The signal estimator 16 takes the sampled digital values and creates continuous functions, which are used in turn by the velocity estimator 18 to obtain the velocity estimates over particular regions (e.g., 5×5 sample regions) of the image from one frame to the next. The velocity estimates are then used by interpolator 20 to obtain velocity estimates for the unsampled pixels. The process can be repeated with successively smaller down-sampling factors to obtain refined motion estimates.

Figure 2:
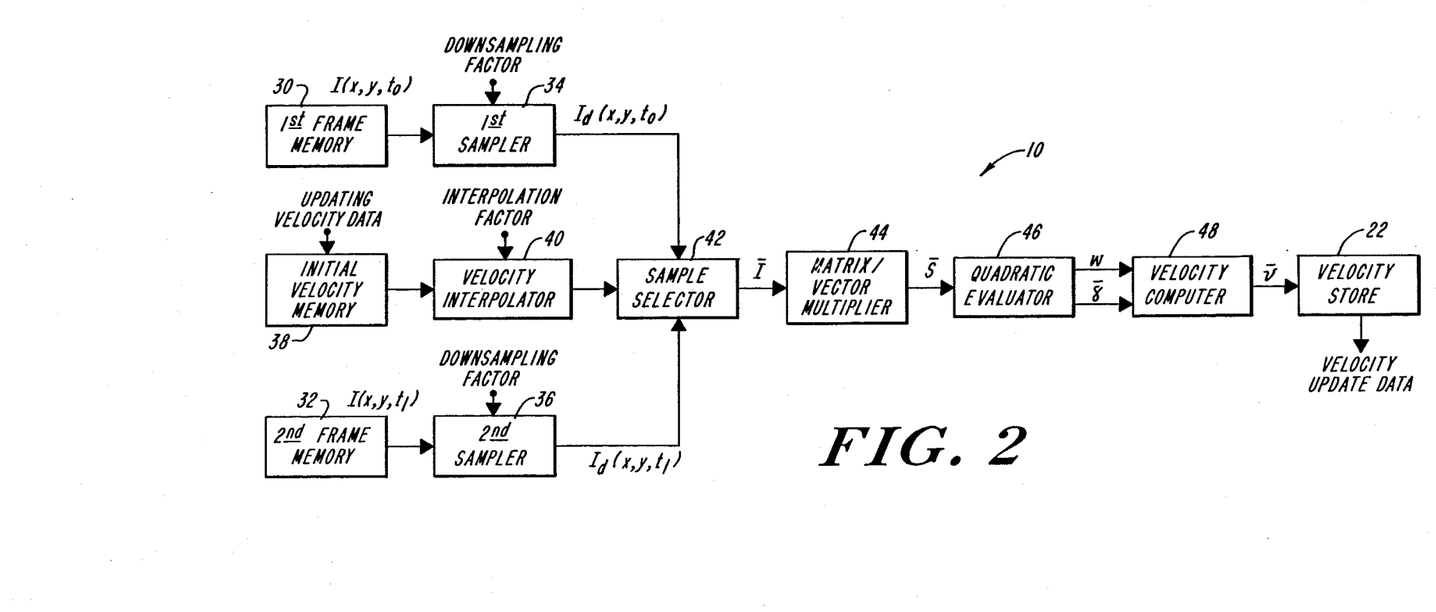
FIG. 2 is a more detailed schematic illustration of the velocity estimating component of the motion estimation apparatus of FIG. 1.

FIG. 2 is a more detailed diagram of an implementation of the motion estimating apparatus of the FIG. 1. As illustrated in FIG. 2, first and second frame memories, 30 and 32 respectively, provide digitized stores of image pixels, which are sampled by first and second samplers, 34 and 36 respectively, to obtain two sets of down-sampled digitized image data, $I_d(x,y,t_o)$ and $I_d(x,y,t_1)$.

At this point it is necessary to select the samples from frame $I(x,y,t_o)$ and frame $I(x,y,t_1)$ which will define the region $\Psi$ to be analyzed. For each point in the image, an initial velocity vector stored in the initial velocity memory 38 is employed to project a region $\Psi$ onto the first and second frames. The velocity interpolator 40 insures that the projectory is appropriately scaled in accord with the down-sampling factor. The end result of this process is a set of samples from the first and second frames which are initially presumed to represent the movement of region $\Psi$ of the image from time $t_o$ to time $t_1$. This set is organized in vector format by sample selector 42 to establish a sample vector, $\bar{I}$, and subjected to matrix/vector multiplication by multiplier 44 to obtain signal coefficients, $S_i$. Quadratic evaluator 46 derives a covariance matrix W and a correlation vector $\bar{\gamma}$ from the signal coefficient vector $\bar{S}$, and from these parameters, velocity computer 48 computes a new velocity estimate, $\bar{v}$, which is stored in store 22 and used to update the initial velocity memory 38.

The sample selector 42 defines the region $\Psi$ over which motion is to be estimated. At each point (x,y,t) an intial velocity estimate $v^*(x,y,t)$ is obtained from velocity memory 38 and interpolator 40. (For system initialization, the velocity typically is assumed to be zero). The selector 42 selects frames $I(x,y,t_o)$ and $I(x,y,t_1)$ from frame memory elements 30 and 32. The frames are selected such that $t_o$ is less than $t_1$, and $$\bar{d}_0 = \bar{v}^*(x,y,t) \cdot (t - t_0) \qquad (9)$$
$$\bar{d}_1 = \bar{v}^*(x,y,t) \cdot (t - t_1)$$

From these two displacement vectors, two sets of L×L image samples (typically 5×5 matrices) are obtained from the frames, with each window centered about the displacement vector so that:

$$\int\int\int_\psi dx\,dy\,dt \rightarrow \int_{-M}^{M}\int_{-M}^{M}\int_{t_0}^{t_1} dx\,dy\,dt \qquad (10)$$

where L=2M+1.

Multiplier 44 performs a matrix/vector multiplication using the samples defined by selector 42 to obtain the signal coefficients $S_i$. As noted above the system assumes that the signal can be represented by the equation (7) set forth above, and that a least squares estimate of $S_i$ can be obtained by minimizing the following error function set forth in equation (8) above.

In multiplier 44 the minimizing operation is performed by matrix multiplication such that:

$$\bar{S} = (A_{st}^T A_{st})^{-1} A_{st}\bar{I} \rightarrow \bar{S} = Q_{st}\bar{I} \qquad (11)$$

where $Q_{st} = (A_{st}^T A_{st})^{-1} A_{st}$ and $$A_{st} = \begin{bmatrix} \phi_1(x_1,y_1,t_1) & \cdots & \phi_P(x_1,y_1,t_1) \\ \cdot & & \cdot \\ \cdot & & \cdot \\ \cdot & & \cdot \\ \phi_1(x_N,y_N,t_N) & \cdots & \phi_P(x_N,y_N,t_N) \end{bmatrix} \qquad (12)$$

The basis functions $\Phi_i(x,y,t)$ are selected to perform signal smoothing and should be easily differentiable. The rank of $A_{st}$ is equal to P, the number of basis functions. One exemplary choice of basis functions is the set of three dimensional polynomials:

$$\phi_1(x,y,t) = 1 \quad \phi_2(x,y,t) = x \quad \phi_3(x,y,t) = y \quad (13)$$
$$\phi_4(x,y,t) = t \quad \phi_5(x,y,t) = x^2 \quad \phi_6(x,y,t) = y^2$$
$$\phi_7(x,y,t) = xy \quad \phi_8(x,y,t) = xt \quad \phi_9(x,y,t) = yt$$

Once multiplier 44 has generated the signal coefficients $S_i$, evaluator 46 can employ this continuous function to obtain W and $\bar{\gamma}$. Thus, W and $\bar{\gamma}$ can be computed as follows:

$$W_{11} = \bar{S}^T G_x \bar{S} \text{ where } G_x(i,j) = \quad (14)$$

$$\iiint_\Psi \left(\frac{\partial \phi_i}{\partial x}\right)\left(\frac{\partial \phi_j}{\partial x}\right) dx\, dy\, dt$$

$$W_{12} = W_{21} = \bar{S}^T G_{xy} \bar{S} \text{ where } G_{xy}(i,j) =$$

$$\iiint_\Psi \left(\frac{\partial \phi_i}{\partial x}\right)\left(\frac{\partial \phi_j}{\partial y}\right) dx\, dy\, dt$$

$$W_{22} = \bar{S}^T G_y \bar{S} \text{ where } G_y(i,j) =$$

$$\iiint_\Psi \left(\frac{\partial \phi_i}{\partial y}\right)\left(\frac{\partial \phi_j}{\partial y}\right) dx\, dy\, dt$$

$$\gamma_1 = \bar{S}^T G_{xt} \bar{S} \text{ where } G_{xt}(i,j) =$$

$$\iiint_\Psi \left(\frac{\partial \phi_i}{\partial x}\right)\left(\frac{\partial \phi_j}{\partial t}\right) dx\, dy\, dt$$

$$\gamma_2 = \bar{S}^T G_{yt} \bar{S} \text{ where } G_{yt}(i,j) =$$

$$\iiint_\Psi \left(\frac{\partial \phi_i}{\partial y}\right)\left(\frac{\partial \phi_j}{\partial t}\right) dx\, dy\, dt$$

Once W and $\bar{\gamma}$ are determined, the velocity components $v_x$ and $v_y$ of the velocity field are defined by the linear equation $Wv = \bar{\gamma}$.

The velocity estimates can be further refined by weighted averaging using the eigenvalues of the covariance matrix W. This averaging technique is based upon the observation that high contrast images yield better velocity estimates and the eigenvalues of W are proportional to the contrast. Let $\lambda_1$ and $\lambda_2$ be the eigenvalues of W at some point, such that $\lambda_1 \geq \lambda_2$. An averaged velocity field can be derived for each point according to the following equation:

$$\bar{v}_{avg} = \sum_{i=1}^{N} v_i w_i \quad (15)$$

where $$w_i = \frac{\lambda_1(i) + \lambda_2(i)}{\sum_{J=1}^{N} (\lambda_1(j) + \lambda_2(j))} \quad (16)$$

and $\lambda_1(i)$ and $\lambda_2(i)$ are the eigenvalues of W at the ith position and the summation from J=1 to J=N represents the eigenvalues for the jth position in vicinity of the desired point.

The eigenvalues and eigenvectors of the covariance matrix W can also be used to address particular problems. If the eigenvalues $\lambda_1$ and $\lambda_2$ and eigenvectors $\bar{a}_1$ and $\bar{a}_2$ of the symmetric $2 \times 2$ matrix W are computed, then a uniform background is observed whenever neither $\lambda_1$ nor $\lambda_2$ exceed a threshold value. In such cases a zero velocity field can be assumed. Moreover, an edge is detected when $\lambda_1$ greatly exceeds $\lambda_2$.

In the case of edge detection, a more effective equation for estimating the velocity vector can be employed as follows:

$$\bar{v} = \frac{\bar{a}_1^T \bar{\gamma} \bar{a}_1}{\lambda_1} \quad (17)$$

In all other cases the normal velocity vector computation, i.e. $\bar{v} = W^{-1}\bar{\gamma}$, can be employed.

Figures 3, 4, 4A:
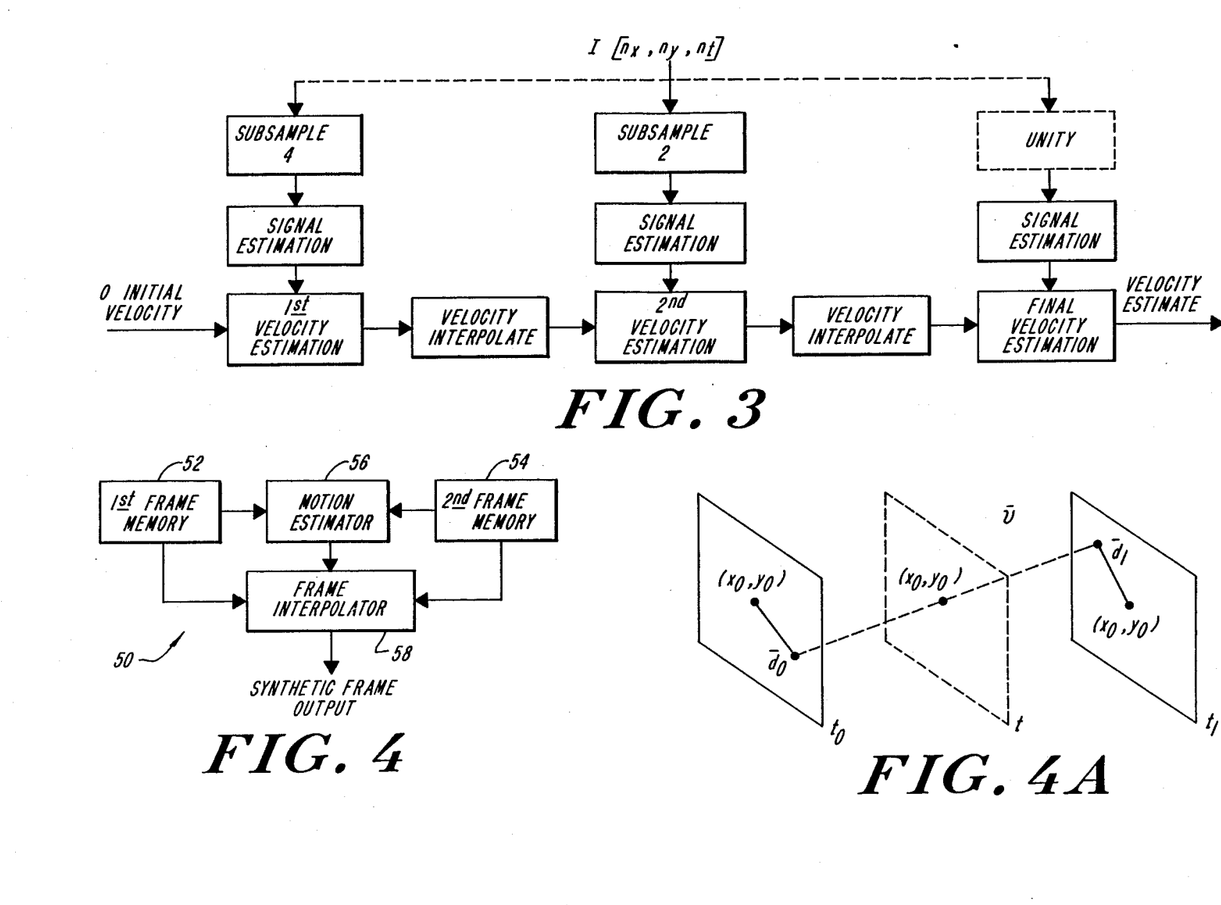
FIG. 3 is a flow diagram of a multigrid velocity estimation technique according to the present invention.
FIG. 4 is a schematic illustration of an image synthesizing apparatus according to the invention.
FIG. 4A is a schematic illustration of the operation performed by the system of FIG. 4.

In FIG. 3 a flow diagram of a multigrid velocity estimation technique is shown for refinement of velocity estimates. This technique is particularly useful in determining large velocities, with both high resolution and high accuracy. In the multigrid approach, the velocity field is first determined over the entire image on a coarse grid. The coarse grid is obtained from the original frames by down-sampling the images. Down-sampling the images has the property of contracting the velocity field; large velocities in the original frames become small velocities in the down-sampled frames. For example, as shown in FIG. 3, the images can first be down-sampled by a factor of four (i.e. every sixteenth pixel). The velocity estimate computed in this fashion replaces the initial velocity estimate.

The coarse velocity field is interpolated to generate an estimate of the velocity field at a finer grid. The velocity field is then calculated by the methods of the present invention again using a finer subset of samples (i.e. as shown in FIG. 3, down-sampling by a factor of two). The process can be repeated at a successively finer grids until the sampling factor is unity and a final velocity field is obtained.

In FIG. 4 an apparatus for generating synthetic frames is shown. This embodiment is particularly useful for time scale modification of motion pictures. By creating synthetic frames and adding or substituting such frames for all or a portion of the original frames, one can lengthen or shorten the time taken to play or broadcast a motion picture. The synthetic frame generating system 50 of FIG. 4 includes a first frame memory 52 and a second frame memory 54, a motion estimator 56 and frame interpolator 58. Motion estimator 56, similar to the system 10 shown in FIGS. 1 and 2, extracts samples from the frame memories 52 and 54 and generates a velocity field. Frame interpolator 58 then produces a synthetic frame output from the velocity field and the frame memories.

The synthetic frame generating system 50 computes an intermediate velocity field $v(x_0,y_0,t)$ between original frames $I(x,y,t_o)$ and $I(x,y,t_1)$ in accordance with the methods disclosed above. Displacement vectors, $\bar{d}_o$ and $\bar{d}_1$, are again defined as described above by the equations:

$$\bar{d}_0 = \bar{v}(x_0,y_0,t) \cdot (t_0 - t) \quad (9A)$$
$$\bar{d}_1 = \bar{v}(x_0,y_0,t) \cdot (t_1 - t)$$

From the displacement vectors $\bar{d}_o$ and $\bar{d}_1$, frame interpolator 50 computes the points $I(\bar{x}_o-\bar{d}_o,t_o)$ and $I(\bar{x}_1-\bar{d}_1,t_1)$. To obtain intermediate frame values, the following formula can be employed:

$$\text{If } |t_0 - t| < |t_1 - t| \text{ then } I(\bar{x}_0,t) = I(\bar{x}_0 - \bar{d}_0,t_0) \qquad (18)$$
$$\text{otherwise } I(\bar{x}_0,t) = I(\bar{x}_1 - \bar{d}_1,t_1)$$

FIG. 4A is a schematic illustration of the operation performed by system 50 of FIG. 4.

Figure 5:
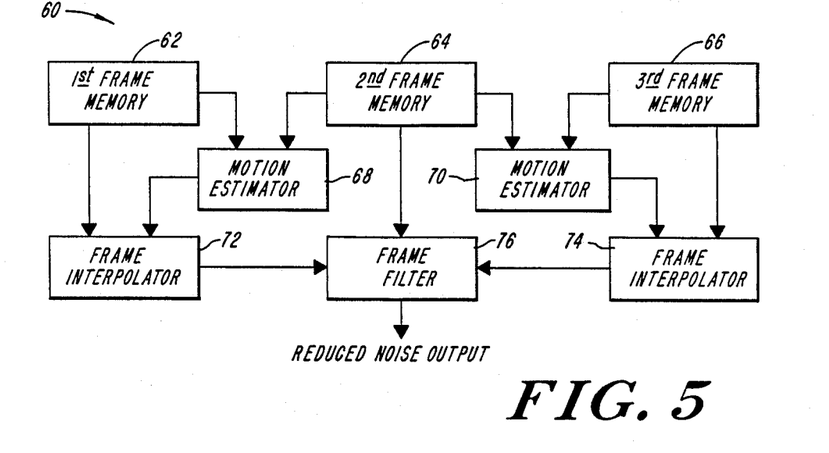
FIG. 5 is a schematic illustration of an image noise reduction apparatus according to the invention.

In FIG. 5 a noise reduction system 60 is shown, particularly useful in preparing still "snapshots" from individual motion picture frames. The noise reduction system 60 of FIG. 5 includes first, second and third frame memories 62, 64, 66, respectively, motion estimators 68 and 70, frame interpolators 72 and 74, and filter 76.

Motion estimator 68 estimates a velocity vector $\bar{v}_o$ from samples extracted in the first and second frame memories 62, 64. Similarly, motion estimator 70 estimates a velocity vector $\bar{v}_1$ from sample stored in the second and third frame memories 64, 66.

In frame interpolator 72, velocity vector $\bar{v}_o$ is used to compute a synthetic version of the middle (second) frame. In a similar fashion, frame interpolator 74 generates another synthetic version of the second frame based in this instance on velocity vector $\bar{v}_1$. As before, displacement vectors are computed from the velocity vectors, viz:

$$\bar{d}_0 = v_0 \cdot (t_0 - t) \qquad (9B)$$
$$\bar{d}_1 = v_1 \cdot (t_1 - t)$$

Figure 5A:
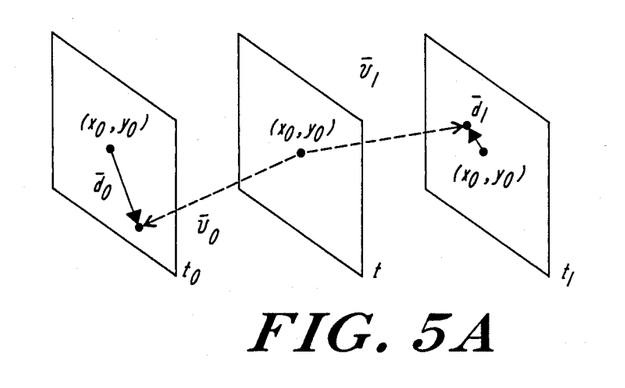
FIG. 5A is a schematic illustration of the operation performed by the system of FIG. 5.

The two synthetic versions and the original frame data from the second frame memory are then processed by filter 76 (e.g. by averaging or median selection) to obtain the final, noise-reduced, output. This technique can be used to obtain enhanced snapshots of any particular frame, or can be employed to provide continuous, real-time processing prior to display, transmission, etc. FIG. 5A is a schematic illustration of the operation preformed by the system 60 of FIG. 5.

Figure 6:
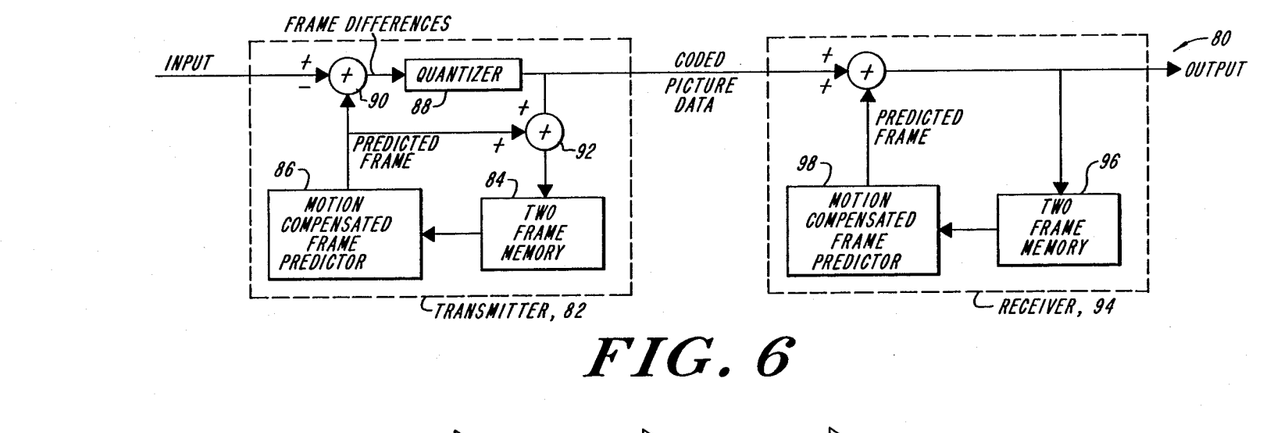
FIG. 6 is a schematic illustration of an image coding apparatus according to the invention.

In FIG. 6, a motion picture coding system 80 employing the present invention is shown. Transmitter 82 includes a two frame memory 84, frame predictor 86, quantizer 88, and summers 90 and 92. Receiver 94 includes another two frame memory 96, frame predictor 98 and summer 100. In the transmitter 82, frame predictor 86 estimates a velocity $\bar{v}$ from the two frame memory 84 and uses it to synthesize a predicted frame. The predicted frame is subtracted from the next actual frame in summer 90 and the differences only are processed by quantizer 88 for transmission. (The actual frame can be reconstructed by adding the predicted frame and the quantizer output using summer 92 in order to update frame memory 84.)

In a similar fashion, frame predictor 98 in receiver 94 estimates velocity $\bar{v}$ from two frame memory 96 and likewise uses it to synthesize a predicted frame. The predicted frame is added to the transmitted difference signals in summer 100 to obtain a picture output and update the receiver's frame memory 96.

Both frame predictor 86 and frame predictor 98 predict a frame at time t from frames at $t_o$ and $t_1$, where t is greater than $t_1$, and $t_1$ is greater than $t_o$. As before, a velocity vector is computed from the image data and a displacement vector d is calculated as follows $$\bar{d} = \bar{v}(x_0, y_0, t) \cdot t_1 - t) \qquad (9C)$$

The predicted value in frame t is $$I(\bar{x},t) = I(\bar{x}_0 - \bar{d}, t_1) \qquad (18A)$$

Figure 6A:
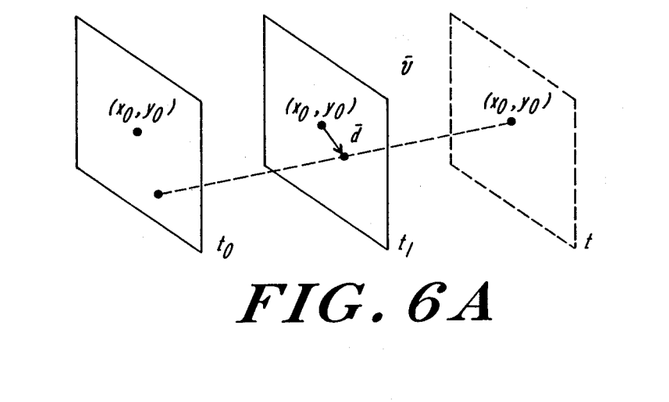
FIG. 6A is a schematic illustration of the operation performed by the system of FIG. 6.

FIG. 6A is schematic illustration of the frame prediction operations performed by predictors 86 and 98 in FIG. 6.

In each of the above-described implementations, motion estimation errors can be detected by examination of the least squares residual function:

$$\text{Residual} = \iiint_\psi \left\{ \left( v_x \frac{\partial I}{\partial x} + v_y \frac{\partial I}{\partial y} + \frac{\partial I}{\partial t} \right)^2 \right\} dx\, dy\, dt \qquad (3A)$$
$$= S^T G_t S$$

where $$G_t(i,j) = \iiint_\psi \left( \frac{\partial \phi_i}{\partial t} \right)\left( \frac{\partial \phi_j}{\partial t} \right) dx\, dy\, dt$$

If the residual exceeds a predetermined threshold, the estimate should not be used. For frame interpolation applications, a higher-than-threshold residual value, can trigger the system to project zero velocity. In noise reduction applications, a high residual value can trigger suppression of the frame filter. For motion picture coding, the high residual value can suppress frame prediction.

What is claimed is:

1. A method of estimating a velocity field within a motion picture, the method comprising:
    obtaining a set of signal coefficients from a set of image intensity samples over a region of interest to generate a continuous signal representation;
    computing directional gradients from said continuous signal representation; and
    minimizing an average squared directional gradient residual by eigenvalue/eigenvector decomposition to obtain an estimate of the velocity field.

2. The method of claim 1 wherein the step of obtaining a continuous signal representation further includes generating a continuous signal representation from a linear combination of predefined basis functions which are differentiable and linearly independent.

3. The method of claim 2 wherein said continuous signal representation is a set of three dimensional polynominals.

4. The method of claim 1 wherein the method further includes repeating the processing steps over other regions of the motion picture.

5. The method of claim 4 wherein the method further includes improving an initial velocity field estimate over a region by weighted averaging with velocity estimates obtained from neighboring regions.

6. The method of claim 5 wherein the weigths are derived from the eigenvalues computed during eigenvalue/eigenvector decomposition.

7. The method of claim 1 wherein the method further includes detecting an inaccurate velocity field estimate by computing the average squared directional gradient residual from said velocity field estimate and comparing said computed residual with a predefined threshold value.

8. The method of claim 1 wherein the method further includes repeating the processing steps over successive frames of said motion picture.

9. The method of claim 1 wherein the region is selected by down-sampling a portion of image data from a first and a second frame of said motion picture.

10. The method of claim 9 wherein the successively smaller down-sampling factors are used to refine the estimates of the velocity field.

11. The method of claim 1 wherein the method further includes employing the velocity vector obtained by processing said image to filter noise from said picture frames.

12. The method of claim 1 wherein the method further includes employing the velocity vector obtained by processing said image to synthesize intermediate picture frames.

13. The method of claim 1 wherein the method further includes employing the velocity vector obtained by processing said image to obtain a coded image for transmission.

14. Apparatus for estimating a velocity field within a motion picture defined by a plurality of picture frames, the apparatus comprising:

sampling means for selecting a set of samples of image intensity values from at least a first and a second frame by mapping an initial velocity vector onto a region of interest in said first and second frames and selecting from said region in each frame a set of samples of said image values, signal estimating means connected to the sampling means for estimating from said samples a set of signal coefficients which define a continuous signal representation; and velocity estimating means connected to the signal estimating means for computing directional gradients from said continuous signal representation and minimizing an average value of a squared directional gradient residual by eigenvalue/eigenvector decomposition to obtain a velocity estimate over said region of interest.

15. The apparatus of claim 14 wherein the sampling means further includes a first and a second frame memory and means for down-sampling image values stored in said first and second memories.

16. The apparatus of claim 15 wherein the means for down-sampling the image values further includes means for varying the down-sampling rate.

17. The apparatus of claim 14 wherein the signal estimating means generates from said samples a continuous signal representation by linear combination of predefined basis functions which are differentiable and linearly independent.

18. The apparatus of claim 14 wherein the signal estimating means further includes a matrix multiplier in which the set of image samples are multiplied by a matrix of basis functions.

19. The apparatus of claim 18 wherein a set of signal coefficients, $S_i$, are derived from a set of image samples, $\bar{I}$, by matrix multiplication such that:

$$\bar{S} = (A_{st}^T A_{st})^{-1} A_{st} \bar{I} \longrightarrow \bar{S} = Q_{st}\bar{I} \quad (11)$$

where $Q_{st} = (A^T A_{st})^{-1} A_{st}$ and $$A_{st} = \begin{bmatrix} \phi_1(x_1,y_1,t_1) & \cdots & \phi_P(x_1,y_1,t_1) \\ \cdot & & \cdot \\ \cdot & & \cdot \\ \cdot & & \cdot \\ \phi_1(x_N,y_N,t_N) & \cdots & \phi_P(x_N,y_N,t_N) \end{bmatrix} \quad (12)$$

20. The apparatus of claim 18 wherein said basis functions are three dimensional polynomials.

21. The apparatus of claim 20 wherein said basis functions are a $3\times 3$ matrix, the entries of which are defined by the equations:

$$\begin{aligned} \phi_1(x,y,t) &= 1 & \phi_2(x,y,t) &= x & \phi_3(x,y,t) &= y \\ \phi_4(x,y,t) &= t & \phi_5(x,y,t) &= x^2 & \phi_6(x,y,t) &= y^2 \\ \phi_7(x,y,t) &= xy & \phi_8(x,y,t) &= xt & \phi_9(x,y,t) &= yt \end{aligned} \quad (13)$$

22. The apparatus of claim 14 wherein the velocity estimating means further includes a quadratic evaluator which derives from said signal coefficients, a covariance matrix and a correlation vector, and a velocity computer which uses said covariance matrix and correlating vector to minimize the average value of a squared directional gradient residual and, thereby, estimate a velocity vector for the region of interest.

23. The apparatus of claim 14 wherein the apparatus further includes means for updating the initial velocity vector with said revised velocity estimate.

24. The apparatus of claim 14 wherein said apparatus further includes interpolation means for generating from said velocity estimate a synthetic frame between said first and second frames.

25. The apparatus of claim 14 wherein said apparatus further includes means for sampling a third frame and means for deriving another velocity estimate over the region of interest between said second and third frames; and means for enhancing the image values of said second frame by generating synthetic versions of said second frame from said velocity estimates.

26. The apparatus of claim 14 wherein the apparatus further includes a picture coding means comprising frame predicting means for generating a predicted next frame from said first and second frames, means for comparing said predicted next frame with an actual next frame; and means for transmitting a signal comprising differences between the predicted frame and the actual frame.

27. An image synthesizing system for generating between-frame, motion picture images, the system comprising:

sampling means for selecting a set of samples of image intensity values from at least a first and a second frame by mapping an initial velocity vector onto a region of interest in each of said frames;

signal estimating means for estimating from said samples a set of signal coefficients which define a continuous signal representation of changes in image values from said first frame to said second frame;

velocity estimating means for computing directional gradients from said continuous signal representation and minimizing an average value of a squared directional gradient by eigenvalue/eigenvector decomposition to obtain a velocity field estimate over said region from the first frame to the second frame; and interpolating means for generating from said velocity field estimate a synthetic between-frame image.

28. An image enhancing system for enhancing a frame of a motion picture, the image enhancing system comprising:

sampling means for selecting a set of samples of image intensity values from a frame of interest and at least one preceding and one succeeding frame by mapping an initial velocity vector onto a region of interest in each of said frames;

signal estimation means for estimating from said samples a first set of signal coefficients which define a continuous signal representation of changes in the image values from the preceding frame to the frame of interest, and a second set of signal coefficients which define a continuous signal representation of changes in the image values from the frame of interest to the succeeding frame;

velocity estimating means for estimating a first velocity field over said region from the first frame to the second frame and for estimating a second velocity field over said region from the second frame to the third frame from said continuous signal representation by eigenvalue/eigenvector decomposition;

interpolation means for generating from said velocity estimates a first and second synthetic version of the frame of interest; and processing means for processing the frame of interest and the synthetic versions thereof to obtain an enhanced set of image values for the frame.

29. The apparatus of claim 28 wherein the processing means is an averaging means.

30. The apparatus of claim 28 wherein the processing means is a means for selecting the median value from the frame of interest and the synthetic versions thereof.

31. A picture coding system for transmitting image data, the picture coding system comprising:

sampling means for selecting a set of samples of image intensity values from at least a first and a second frame by mapping an initial velocity vector onto a region of interest in each of said frames;

signal estimating means for estimating from said samples a set of signal coefficients which define a continuous signal representation of changes in image values from said first frame to said second frame;

velocity estimating means for computing directional gradients from said continuous signal representation and minimizing an average value of a squared directional gradient by eigenvalue/eigenvector decomposition to obtain a velocity field estimate over said region from the first frame to the second frame;

frame prediction means for generating or predicted next frame from said velocity field estimate and the image values of said first and second frames;

comparison means for comparing the predicted next frame with an actual next frame to detect differences in image value; and transmitter means for transmitting a signal comprising differences between the predicted frame and the actual frame.

* * * * *

UNITED STATES PATENT AND TRADEMARK OFFICE
CERTIFICATE OF CORRECTION

PATENT NO. : 4,838,685

DATED : June 13, 1989

INVENTOR(S) : Martinez et al.

It is certified that error appears in the above-identified patent and that said Letters Patent is hereby corrected as shown below:

Column 2, line 19, "x" should read --$\bar{x}$--.

Column 2, line 33, "," should read --.--.

Column 7, line 46, "$v_x$ and $v_y$" should read --$\bar{v}_x$ and $\bar{v}_y$--.

Signed and Sealed this

Sixth Day of March, 1990

*Attest:*

JEFFREY M. SAMUELS

*Attesting Officer*  *Acting Commissioner of Patents and Trademarks*